US012695767B2

(12) United States Patent　　　　　(10) Patent No.: US 12,695,767 B2
Pandey et al.　　　　　　　　　　　　　(45) Date of Patent: Jul. 28, 2026

(54) PREDICTIVE BAD EVENT ALERT GENERATION

(71) Applicant: Palo Alto Networks, Inc., Santa Clara, CA (US)

(72) Inventors: Santosh Ghanshyam Pandey, Fremont, CA (US); Mohil Khare, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 247 days.

(21) Appl. No.: 17/737,812

(22) Filed: May 5, 2022

(65) Prior Publication Data

US 2023/0362178 A1　　Nov. 9, 2023

(51) Int. Cl.
*H04L 9/40*　　　(2022.01)
*G06F 11/07*　　(2006.01)
*G06F 18/2134*　(2023.01)
*H04L 41/0631*　(2022.01)

(52) U.S. Cl.
CPC ........ *H04L 63/1425* (2013.01); *G06F 11/079* (2013.01); *G06F 18/21342* (2023.01); *H04L 41/0631* (2013.01)

(58) Field of Classification Search
CPC ............. H04L 63/1425; H04L 63/1416; H04L 41/0631; H04L 43/091; G06N 5/022; G06F 11/079; G06F 11/22; G06F 11/36; G06F 11/0703
See application file for complete search history.

(56) References Cited

U.S. PATENT DOCUMENTS

| | | | | |
|---|---|---|---|---|
| 11,223,552 B1 * | 1/2022 | Anderson | ............. | G06F 16/285 |
| 2009/0196186 A1 * | 8/2009 | Lidstrom | ................ | H04L 41/14 |
| | | | | 370/241 |
| 2015/0081701 A1 * | 3/2015 | Lerios | ................... | G06F 16/955 |
| | | | | 707/736 |
| 2018/0041378 A1 * | 2/2018 | Yan | ........................ | H04W 24/04 |
| 2019/0215230 A1 * | 7/2019 | Mermoud | ........... | H04L 41/0677 |
| 2021/0397500 A1 * | 12/2021 | Wieder | .............. | G06F 11/3495 |
| 2023/0095756 A1 * | 3/2023 | Wilkinson | .......... | H04L 63/1416 |
| | | | | 726/6 |

FOREIGN PATENT DOCUMENTS

| | | | | | |
|---|---|---|---|---|---|
| CA | 2651529 A1 * | 7/2009 | ......... | H04L 41/0631 |
| EP | 3179696 A1 * | 6/2017 | .......... | G06F 21/554 |

* cited by examiner

*Primary Examiner* — Alexander Lagor
*Assistant Examiner* — Brandon Binczak
(74) *Attorney, Agent, or Firm* — Gilliam IP PLLC

(57) ABSTRACT

Segments of a network having connectivity issues are detected in a network environment that may include one or more cloud computing platforms. A mutual information algorithm is used to determine relevance of network element factors, a subset of factors are selected based on relevance, and clustered according to values for the subset of factors, and quality of the clusters evaluated. Various thresholds for selecting the subset of factors may be used to determine which provides improved cluster quality. An approach for performing root cause analysis of events in a network environment selects bad events for logging alerts based on whether a factor is found to distinguish bad events according to a mutual information algorithm. Events for alerts may be aggregated based on temporal proximity or similarity. Visualization may be performed using Sankey diagrams with each column representing a factor.

23 Claims, 10 Drawing Sheets

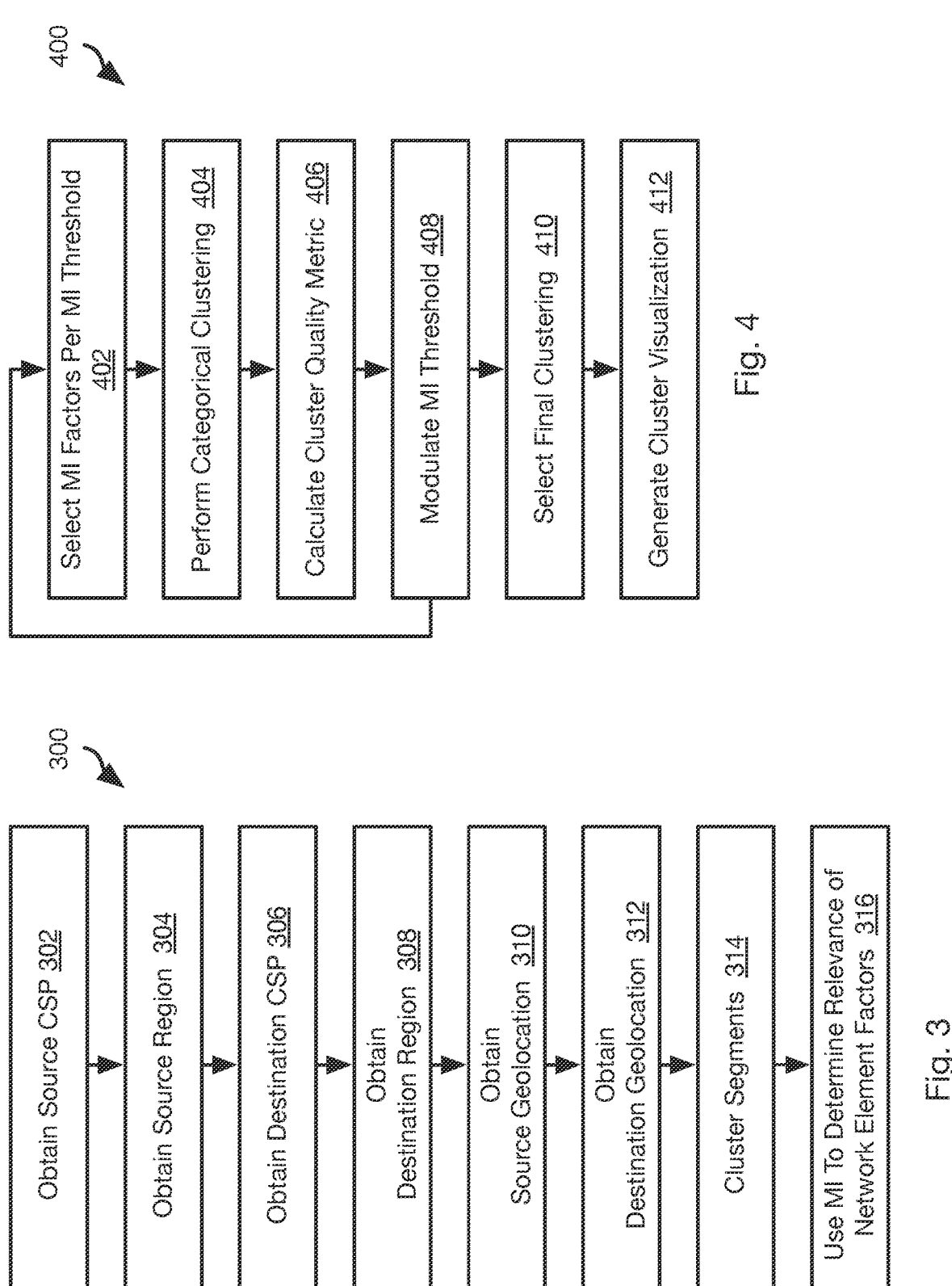

400

Select MI Factors Per MI Threshold 402

Perform Categorical Clustering 404

Calculate Cluster Quality Metric 406

Modulate MI Threshold 408

Select Final Clustering 410

Generate Cluster Visualization 412

Obtain Source CSP 302

Obtain Source Region 304

Obtain Destination CSP 306

Obtain Destination Region 308

Obtain Source Geolocation 310

Obtain Destination Geolocation 312

Cluster Segments 314

Use MI To Determine Relevance of Network Element Factors 316

Fig. 3

PREDICTIVE BAD EVENT ALERT GENERATION

RELATED APPLICATIONS

This application is related to U.S. application Ser. No. 17/737,787 filed May 5, 2022, which is incorporated herein by reference for all purposes.

FIELD OF THE INVENTION

The present invention relates generally to systems and methods for implementing enterprise security with respect to applications hosted on a cloud computing platform.

BACKGROUND OF THE INVENTION

Currently, there is a trend to relocate applications, databases, and network services to cloud computing platforms. Cloud computing platforms relieve the user of the burden of acquiring, setting up, and managing hardware. Cloud computing platforms may provide access across the world, enabling an enterprise to operate throughout the world without needing a physical footprint at any particular location.

However, implementing a security perimeter for a cloud computing platform becomes a more complex problem compared to hosting on premise equipment. For example, an enterprise may host applications on multiple cloud computing platforms that must all be managed. Authenticating users of applications according to a coherent policy in a diverse environment is difficult using current approaches. These problems are further complicated when users of the applications of an enterprise are accessing the applications from diverse locations across the globe.

It would be an advancement in the art to implement an improved solution for managing access to applications hosted in a cloud computing platform.

BRIEF DESCRIPTION OF THE DRAWINGS

Embodiments of the disclosure may be better understood by referencing the accompanying drawings. These drawings depict only typical embodiments of the invention and are not therefore to be considered limiting of its scope.

FIG. 3 is a process flow diagram of a method for clustering segments in accordance with an embodiment of the present invention;

FIG. 4 is a process flow diagram of a method for selecting factors according to cluster quality in accordance with an embodiment of the present invention;

DETAILED DESCRIPTION

Figure 1:
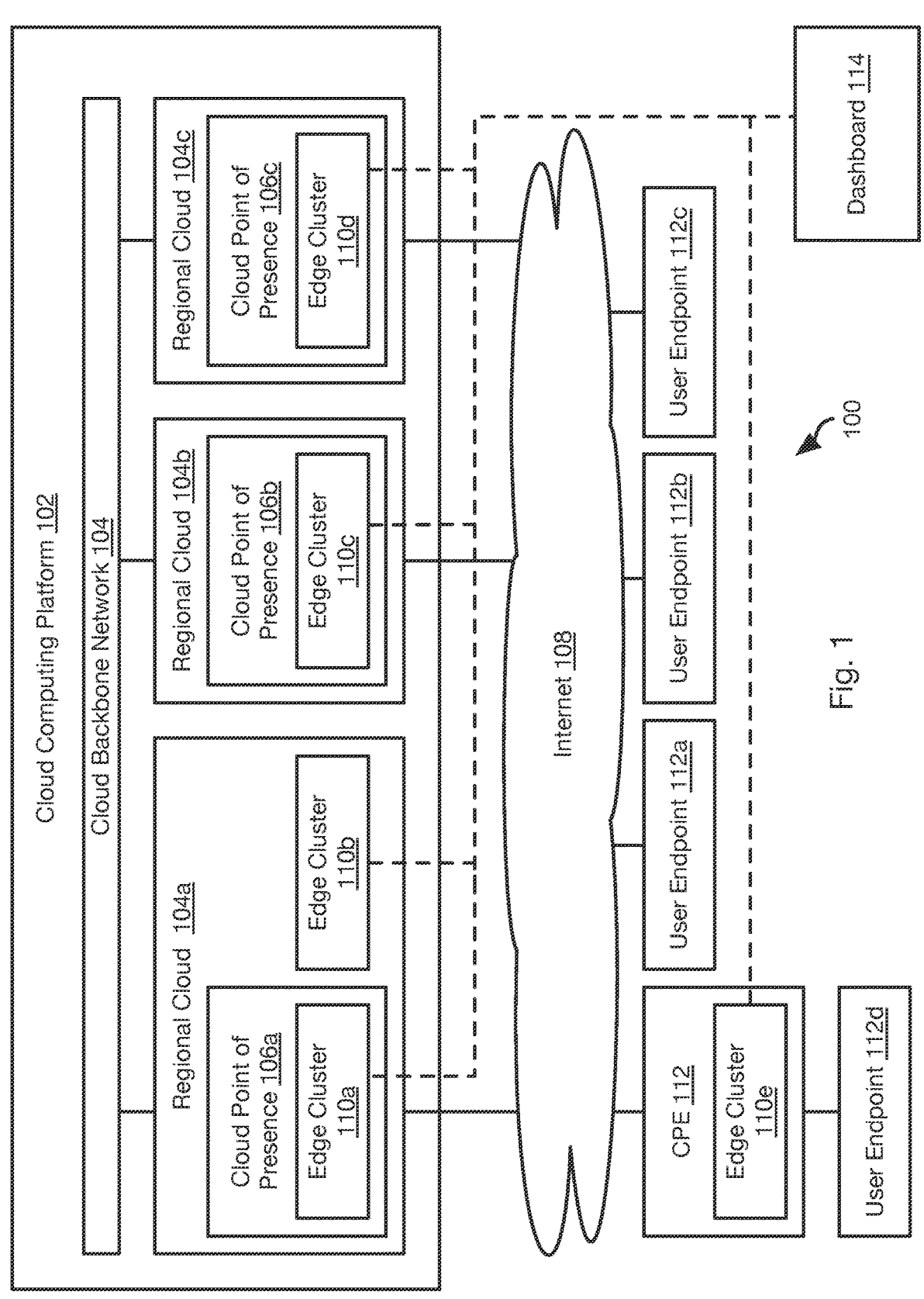
FIG. 1 is a schematic block diagram of a network environment for managing access to cloud-based applications in accordance with an embodiment of the present invention.

It will be readily understood that the components of the present invention, as generally described and illustrated in the figures herein, could be arranged and designed in a wide variety of different configurations. Thus, the following more detailed description of the embodiments of the invention, as represented in the figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Referring to FIG. 1, a network environment 100 may include one or more cloud computing platforms 102, such as AMAZON WEB SERVICES (AWS), MICROSOFT AZURE, GOOGLE CLOUD PLATFORM, or the like. As will be discussed below, multiple cloud computing platforms 102 from multiple providers may be used simultaneously. As known in the art, a cloud computing platform 102 may be embodied as a set of computing devices coupled to networking hardware and providing virtualized computing and storage resources such that a user may instantiate and execute applications, implement virtual networks, and allocate and access storage without awareness of the underling computing devices and network hardware A cloud computing platform 102 from the same provider may be divided into different regional clouds, with each regional cloud including a set of computing devices in or associated with a geographic region and connected by a regional network. These regional clouds may be connected to one another by a cloud backbone network 104. The cloud backbone network 104 may provide high throughput and low latency network connections for traffic among a plurality of regional clouds 104a-104c. The cloud backbone network 104 may include routers, switches, servers and/or other networking components connected by high-capacity fiber optic networks, such as transoceanic fiber optic cables, the Internet backbone, or other high-speed networks. Each regional cloud 104a-104c may include cloud computing devices and networking hardware located in and/or processing traffic from a particular geographic region, such as a country, state, continent, or other arbitrarily defined geographic region.

A regional cloud 104a-104c may include one or more points of presence (POPs) 106a-106c. For example, each regional cloud 104a-104c may include at least one POP 106a-106c. A cloud POP 106a-106c may be a physical location hosting physical network hardware that implements an interface with an external network, such as a wide area network (WAN) that is external to the cloud computing platform 102. The WAN may, for example, be the Internet 108. For example, a high-speed, high-capacity network connection of an Internet service provider (ISP) may connect to the POP 106a-106c. For example, the network connection may be a T1 line, leased line, fiber optic cable, Fat Pipe, or other type of network connection. The POP 106a-106c may have a large amount of servers and networking equipment physically located at the POP 106a-106c, enabling the POP 106a-106c to handle network traffic to and from the network connection and possibly providing computing and storage at the POP 106a-106c.

The POP 106a-106c therefore enables users to communicate with the cloud computing platform 102 very efficiently and with low latency. A cloud computing platform 102 may implement other entrance points from the Internet 108 in a particular regional cloud 104a-104c. However, a POP 106a-106c may be characterized as providing particularly low latency as compared to other entrance points.

Edge clusters 110a-110c may execute throughout a cloud computing platform 102. Edge clusters 110a-110c may operate as a cooperative fabric for providing authenticated access to applications and performing other functions as described herein. Edge clusters 110a, 110c, 110d may be advantageously hosted at a cloud POP 106a-106c. Edge clusters 110b may also be implemented at another location within a cloud computing platform 102 other than a cloud POP 106a-106c. In some instances, one or more edge cluster 110e may also execute on Customer Premise Equipment (CPE) 112. One or more edge cluster 110e on CPE 112 may be part of a fabric including one or more edge clusters 110a-110d executing in a cloud computing platform 102. Edge clusters 110a-110d on cloud computing platforms 102 of different providers may also form a single fabric functioning according to the functions described herein.

Each edge cluster 110a-110e may be implemented as a cluster of cooperating instances of an application. For example, each edge cluster 110a-110e may be implemented as a KUBERNETES cluster managed by a KUBERNETES master, such that the cluster includes one or pods, each pod managing one or more containers each executing an application instance implementing an edge cluster 110a-110e as described herein. As known in the art, a KUBERNETES provide a platform for instantiating, recovering, load balancing, scaling up, and scaling down, an application including multiple application instances. Accordingly, the functions of an edge cluster 110a-110c as described herein may be implemented by multiple application instances with management and scaling up and scaling down of the number of application instances being managed by a KUBERNETES master or other orchestration platform.

Users of a fabric implemented for an enterprise may connect to the edge clusters 110a-110e from endpoints 112a-112d, each endpoint being any of a smart phone, tablet computer, laptop computer, desktop computer, or other computing device. Devices 110a-110a may connect to the edge clusters 110a-110e by way of the Internet or a local area network (LAN) in the case of an edge cluster hosted on CPE 112.

Coordination of the functions of the edge clusters 110a-110e to operate as a fabric may be managed by a dashboard 114. The dashboard 114 may provide an interface for configuring the edge clusters 110a-110e and monitoring functioning of the edge clusters 110a-110e. Edge clusters 110a-110e may also communicate directly to one another in order to exchange configuration information and to route traffic through the fabric implemented by the edge clusters 110a-110e.

In the following description, the following conventions may be understood: reference to a specific entity (POP 106a, edge cluster 110a, endpoint 112a) shall be understood to be applicable to any other instances of that entity (POPs 106b-106c, edge clusters 110b-110e, endpoints 112b-112d). Likewise, examples referring to interaction between two separate entities (e.g., an edge cluster 110a and an endpoint 112a, an edge cluster 110a and another edge cluster 110b, etc.) shall be understood to be applicable to any other pair of entities having the same type or types. Unless specifically ascribed to an edge cluster 110a-110e or other entity, the entity implementing the systems and methods described herein shall be understood to be the dashboard 114 and the computing device or cloud computing platform 102 hosting the dashboard 114.

Although a single cloud computing platform 102 is shown, there may be multiple cloud computing platforms 102, each with a cloud backbone network 104 and one or more regional clouds 104a-104c. Edge clusters 110a-110e may be instantiated across these multiple cloud computing platforms and communicate with one another to perform cross-platform routing of access requests and implementation of a unified security policy across multiple cloud computing platforms 102.

Where multiple cloud computing platforms 102 are used, a multi-cloud backbone 104 may be understood to be defined as routing across the cloud backbone networks 104 of multiple cloud computing platforms 102 with hops between cloud computing platforms being performed over the Internet 108 or other WAN that is not part of the cloud computing platforms 102. Hops may be made short, e.g., no more than 50 km, in order to reduce latency. As used herein, reference to routing traffic over a cloud backbone network 104 may be understood to be implementable in the same manner over a multi-cloud backbone as described above.

Figure 2:
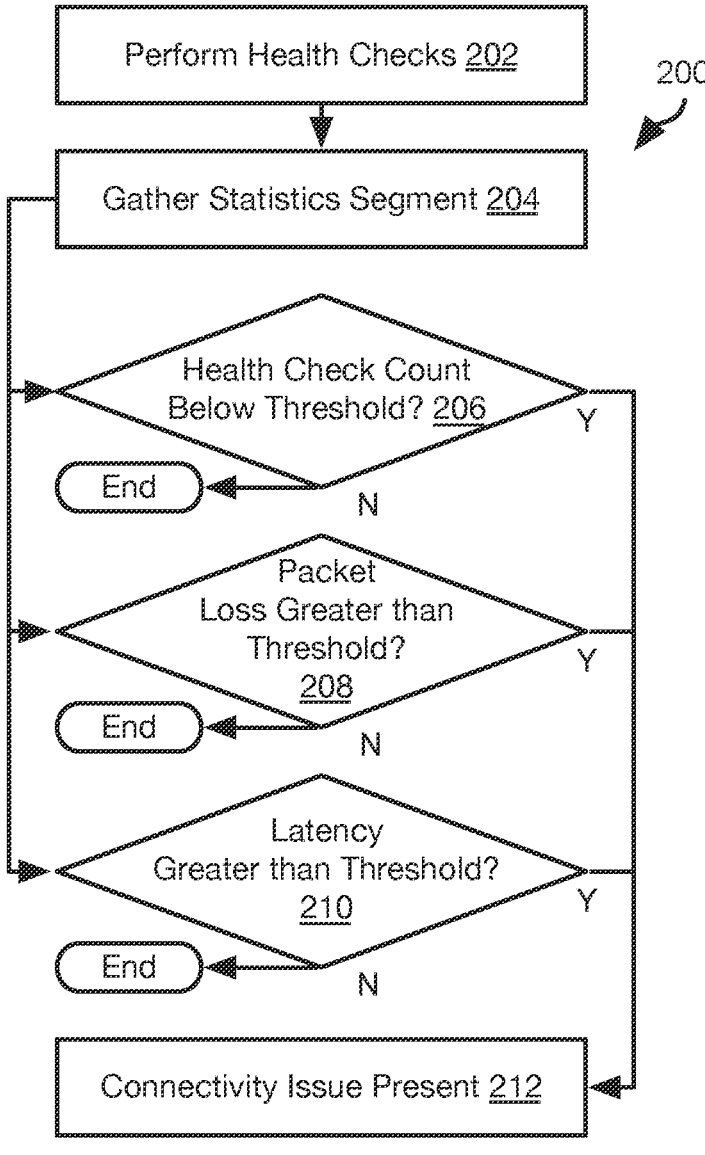
FIG. 2 is a process flow diagram of a method for identifying connectivity issues in accordance with an embodiment of the present invention.

Referring to FIG. 2, while still referring to FIG. 1, a network path between one edge cluster 110a-110d and another edge cluster 110a-110d is referred to herein as a segment and the edge clusters 110a-110d on either end of the segment are referred to as nodes. The network path for each segment may include the cloud backbone network 104, the Internet 108, portion of a regional cloud 104a-104c, cloud POP 106a-106c, CPE 112, or any other network, portion of a network, or network component. In some embodiments, segments may also be defined as network paths between nodes that are each embodied as either a user endpoint 112a-112d or an edge cluster 110a-110d. Segments may be defined between a first node connected to a first cloud computing platform 102 and a second node connected to the first cloud computing platform by way of a second cloud computing platform 102. For example, the first and second cloud computing platforms 102 may be any two of AZURE, AWS, and GOOGLE CLOUD. In the examples, segments are described with reference to cloud computing platforms 102 but the approach described herein may be applied to segments connecting any two computing devices by means of any type of network connection.

FIG. 2 illustrates a method 200 for detecting connectivity issues that may be performed for each segment connecting a first node and a second node. The method 200 may include each node performing 202 a health check of the other node. For example, the first node may send a ping to the second node and evaluate a response received or whether a response was received at all. If a response is received, data may be measured, such as round-trip time, number of packets lost, or other statistics. Health checks may be performed 202 periodically at uniform or non-uniform intervals. The second node may perform a health check with respect to the first node in the same manner.

Statistics obtained from performing 202 the health checks for a segment may be gathered 204 for a rolling window, e.g. the last hour, the last day, or the last X minutes, where X is a predefined integer or floating point value. Statistics may be gathered for each time period in a sequence of non-overlapping time periods, e.g., every hour, every day, or a time period of arbitrary length. Statistics may include average latency (e.g., average round-trip time), average packet loss, total number of failures to respond to a health check, number of health checks performed, a metric of up and/or down time, or other values. Statistics may be gathered for a combination of health check results from both the first node and the second node or may be gathered for the first node and the second node separately.

The gathered statistics may be evaluated according to some or all of steps 206, 208, and 210 as outlined below. For example, the method 200 may include evaluating 206 reachability of one or both nodes of a segment. For example, the method 200 may include evaluating 206 whether the number of health checks is below a health check threshold. The first node and the second node may be programmed to perform health checks at a predefined frequency such that, if the number of health checks falls below the health check threshold, one or both of the first node and the second node may be performing health checks below the predefined frequency and therefore may be experiencing a disruption. The number of health checks performed by the first node and the second node may be evaluated separately with respect to the health check threshold or may be summed and the sum compared to the count threshold. If the number of health checks for one or both of the first node and the second node or the sum is below the health check threshold, the segment may be designated 212 as having connectivity issues.

The method 200 may include evaluating 208 whether the packet loss is greater than a packet loss threshold. This evaluation may be performed with respect to the packet loss of the first node and second node separately or with respect to a sum of the packet losses of the first node and the second node. If the packet loss for one or both of the first node and the second node or the sum is above a packet loss threshold, the segment may be designated 212 as having connectivity issues.

In some embodiments, step 208 may include evaluating whether the daily median packet loss (DMPL) is greater than a packet loss threshold (PLT) multiplied by the interquartile range (IQRPL) of a cumulative distributed function (CDF) of monthly packet losses (e.g., distribution of packet losses per day in a preceding month). Daily Median Packet Loss (DMPL) may be computed as a median value of packet loss percentage over a day or 24 hours. The threshold may therefore be expressed as DMPL>PLT*IQRPL). The interquartile range may be used as a way to detect outliers. The value of PLT may be greater than one, such as between 1.1 and 2, between 1.3 and 1.7, between 1.4 and 1.6, or equal to 1.5.

The method 200 may include evaluating 210 whether the average latency is greater than a latency threshold. This evaluation may be performed with respect to the average latency of the first node and second node separately or with respect to a cumulative average latency of both the first node and the second node. If the average latency for one or both of the first node and the second node or the cumulative average latency is above a latency threshold, the segment may be designated 212 as having connectivity issues.

In some embodiments, step 210 may include evaluating whether the daily median latency (DML) is greater than a latency threshold (LT) multiplied by the interquartile range (IQRL) of a cumulative distributed function (CDF) of monthly latency measurements (e.g., distribution of daily latency measurements in a preceding month). The threshold condition may therefore be expressed as DML>LT*IQRL). The value of LT may be greater than one and between 1.1 and 2, between 1.3 and 1.7, between 1.4 and 1.6, or equal to 1.5.

Steps 206-210 are examples of statistics that may be evaluated. Other attributes of a network connection between the first node and the second node may also be calculated and compared to corresponding threshold to assess connectivity between the first node and the second node. For example, jitter and throughput statistics may be collected and evaluated in a like manner.

Referring to FIG. 3, connectivity issues may have various causes. An edge cluster 110a-110d may go down. A network path between the nodes of a segment may be disrupted due to failure of a network component or a change in network configuration, e.g., a change in domain name service (DNS) configuration or a fully qualified domain name (FQDN) of one or both nodes of the segment or other component on the segment. In either case, the pair of nodes of a segment may become unreachable by one another or by other nodes of the network environment 100. The underlying issue causing a loss of connectivity may be the result of a connection between cloud service providers (CSP) defining part of the segment. A disruption may be such that different geographic regions are unreachable to one another by any regional cloud of any CSP.

With so many possible causes of a connectivity issue of a given segment, it can be very difficult to determine the actual cause. The method 300 of FIG. 3 may be used to facilitate determining the root cause of connectivity issues.

The segments of the network environment 100 may be processed according to the method 300. For each segment, data describing the segment may be collected such as some or all of one or more identifiers of one or more CSPs defining the network path of the segment, one or more identifiers of one or more regional clouds 104a-104c, of the segment, one or more identifiers of one or more edge clusters 110a-110d forming part of the segment, and one or more identifiers of other computing devices or network components defining the network path of the segment. The data collected for a segment may further include the statistics gathered at step 204 of the method 200. The data collected for a segment may include the geolocation of the first and second nodes of the segment and may further include identifiers of one or more regions (e.g., countries, portions of countries) or sub-regions in which the geolocation is located. The regions may correspond to the regions of regional clouds 104a-104c of one or more CSPs.

The method 300 may include clustering the segments based on one or more attributes. In some implementations, a segment may be defined with directionality: a network path from a first node to a second node may be a first segment, with the first node being the source node and the second node being the destination node. The reverse network path from the second node to the first node may be a second segment with the first node as the destination node and the second node as the source node. In such implementations, health checks and statistics for a segment may include only health checks (e.g., pings) performed by the source node with respect to the destination node.

The method 300 may include obtaining 302 a source CSP of the source node of each segment. For example, each segment with a network path including a direct connection from a source node to a CSP (e.g., direct meaning not by way of another CSP) may have that CSP as a source.

The method 300 may include obtaining 304 a source region for each segment. For example, a source node that has a geolocation within a region may have that region as the source region.

The method 300 may include obtaining 306 a destination CSP for each segment. Accordingly, each segment with network path including a direct connection from a destination node connected to a CSP may be assigned that CSP as a destination CSP.

The method 300 may include obtaining 308 a destination region for each segment. For example, a segment having a geolocation within a region may have that region as its destination region. For steps 304 and 308, "region" may correspond to the geographic region of a specific regional cloud 104a-104c.

The method 300 may include obtaining 310 the geolocation of the source node and obtaining 312 the geolocation of the destination node. For steps 310 and 312, "geolocation" may refer to a specific neighborhood, city, metropolitan region, state, or other geographic region or political entity.

The method 300 may include clustering 314 segments according to the values obtained for each segment at steps 302-312 and possibly other values describing the segments. Clustering may include k means clustering or other clustering approach.

The method 300 may further include using 316 a mutual information (MI) algorithm to determine relevance of network element factors. For example, the MI algorithm may be implemented according to the approach described in Seok, J. & Seon Kang, Y., Mutual Information between Discrete Variables with Many Categories using Recursive Adaptive Partitioning. *Sci Rep* 5, 10981 (2015), which is incorporated herein by reference in its entirety.

The network element factors may include any of the factors described above used for clustering (source CSP, destination CSP, source region, destination region, source geolocation, and destination geolocation). Other network element factors may be used either with or without previous clustering of segments with respect to the other network element factors. Examples of other network element factors may include a service provider for an endpoint (e.g., internet service provider, multi-protocol label switching network provider, public internet provider, 5G cellular data provider, etc.).

Using the mutual information algorithm may include determining a relationship between each network element factor and connectivity issues. For example, step 316 may include evaluating a network factor and a metric of connectivity for the segments to determine an amount of mutual information between them. The metric of connectivity may include reachability, packet loss, and latency, which may be measured and statistically characterized as described with respect to FIG. 2. Using the mutual information algorithm may include determining whether a segment is designated as having connectivity issues and a network factor. Step 316 may include evaluating relevance of the network element factors and whether or not a segment has connectivity issues as defined above.

The result of step 316 may be a score or set of scores for each network element factor. For example, a single score may indicate the relevance of the network factor to whether a segment has connectivity issues. Alternatively or additionally, each score of a set of scores may indicate a relevance of a network element to one of a plurality of metrics of connectivity (e.g., reachability, packet loss, and latency).

FIG. 4 illustrates a method 400 for generating a representation of the network environment 100 to facilitate root cause analysis of connectivity issues for one or more segments. The method 400 may include selecting 402 MI factors according to a MI threshold. The threshold may be a predetermined MI threshold and may be adjusted throughout the method 400 as discussed below. For example, step 402 may include selecting the network element factors with scores above the MI threshold.

The method 400 may then include performing 404 categorical clustering of the segments using values of the selected network element factors for the segments. For purposes of the method 400, the segments may include those identified as having connectivity issues according to the method 200. Performing 404 categorical clustering may include using a clustering algorithm, such as k modes clustering, to group the segments into clusters according to similarity of the values of each segment for the selected network element factors. Performing 404 clustering and possibly the clustering of step 314 may be performed using the approach described in Huang, Z., Extensions to the k-modes algorithm for clustering large data sets with categorical values. *Data Mining and Knowledge Discovery* 2 (3), pp. 283-304 (1998), which is incorporated herein by reference in its entirety.

The method 400 may include calculating 406 the quality of the clusters. For example, let the values of the selected network element factors for each segment be considered as a coordinate in a N dimensional space, where N is the number of selected network element factors. The quality of the clusters may increase as a function of the distance between the coordinates of the segments in each cluster and the coordinates of the segments assigned to other clusters. The quality of the clusters may decrease as a function of the distance between the coordinates of the segments in each cluster and the coordinates of other segments assigned to the same cluster. For example, the Elbow method, the Silhouette method, or other quality metric may be used.

The method 400 may include modulating 408 the MI threshold such that different network element factors are selected. The MI threshold may be increased and/or decreased relative to the initial MI threshold used at step 402. Steps 402-406 may be repeated with respect to one or more different MI thresholds selected according to the modulating step 408. The quality metric from step 406 may be evaluated for each MI threshold. Step 408 may also be repeated one or more times according to a particular method, such an optimization algorithm, in order to select an MI threshold providing an improved cluster quality metric. Steps 402-408 may be repeated one or more times until the cluster quality metric converges or a maximum number of iterations is reached.

Since the dimensions (number of network element factors) change with each iteration, some degradation in cluster quality between iterations may be due to increasing dimensionality. Accordingly, a robust quality index may be calculated at step 406, such as the Goodman-Kruskal index. Cluster quality may be evaluated using the approach described in Tomašev, Nenad & Radovanovic, Milos, Clustering Evaluation in High-Dimensional Data. 10.1007/978-3-319-24211-8_4, (2016), which is incorporated herein by reference in its entirety.

The method 400 may then include selecting 410 the clustering for the iteration of step 404 found to have the highest cluster quality metric relative to other iterations of steps 404. The value of the MI threshold used to select the network element factors for that iteration of step 404 may be stored for later use.

Figure 5:
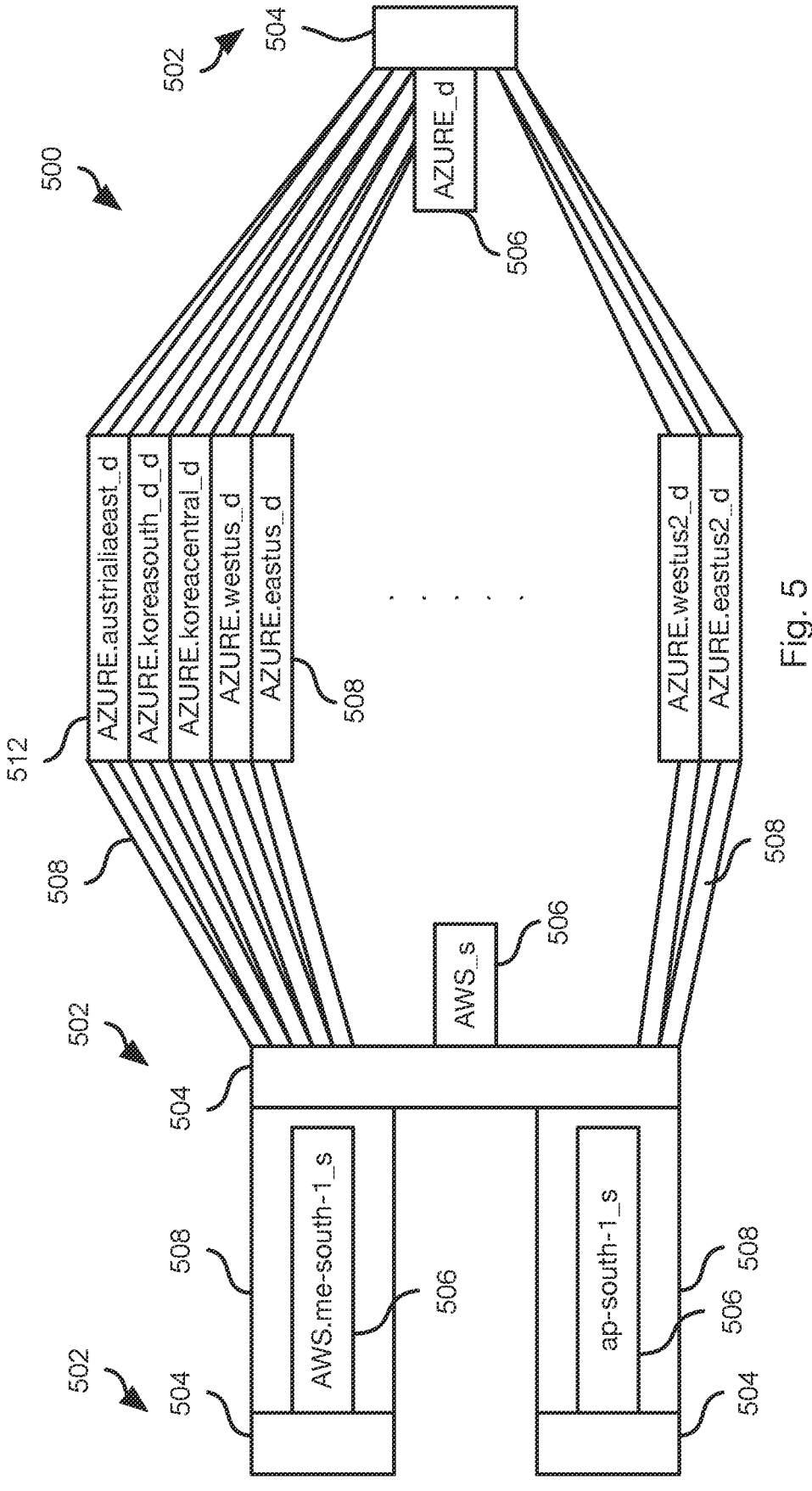
FIG. 5 is an example Sankey diagram for a cluster in accordance with an embodiment of the present invention.

The method 400 may include generating 412 a visualization or other representation of the clusters of segments from the final clustering. For example, FIG. 5, shows an example visualization 500 of an individual cluster in the form of a Sankey diagram. Each horizontal position 502 may represent one of the selected network element factors and each bar 504 at each horizontal position 502 may represent a value for the network element factor assigned to that horizontal position 502. Each bar 504 may include a label 506 indicating the value for the network element factor represented by the bar 504.

Figure 6:
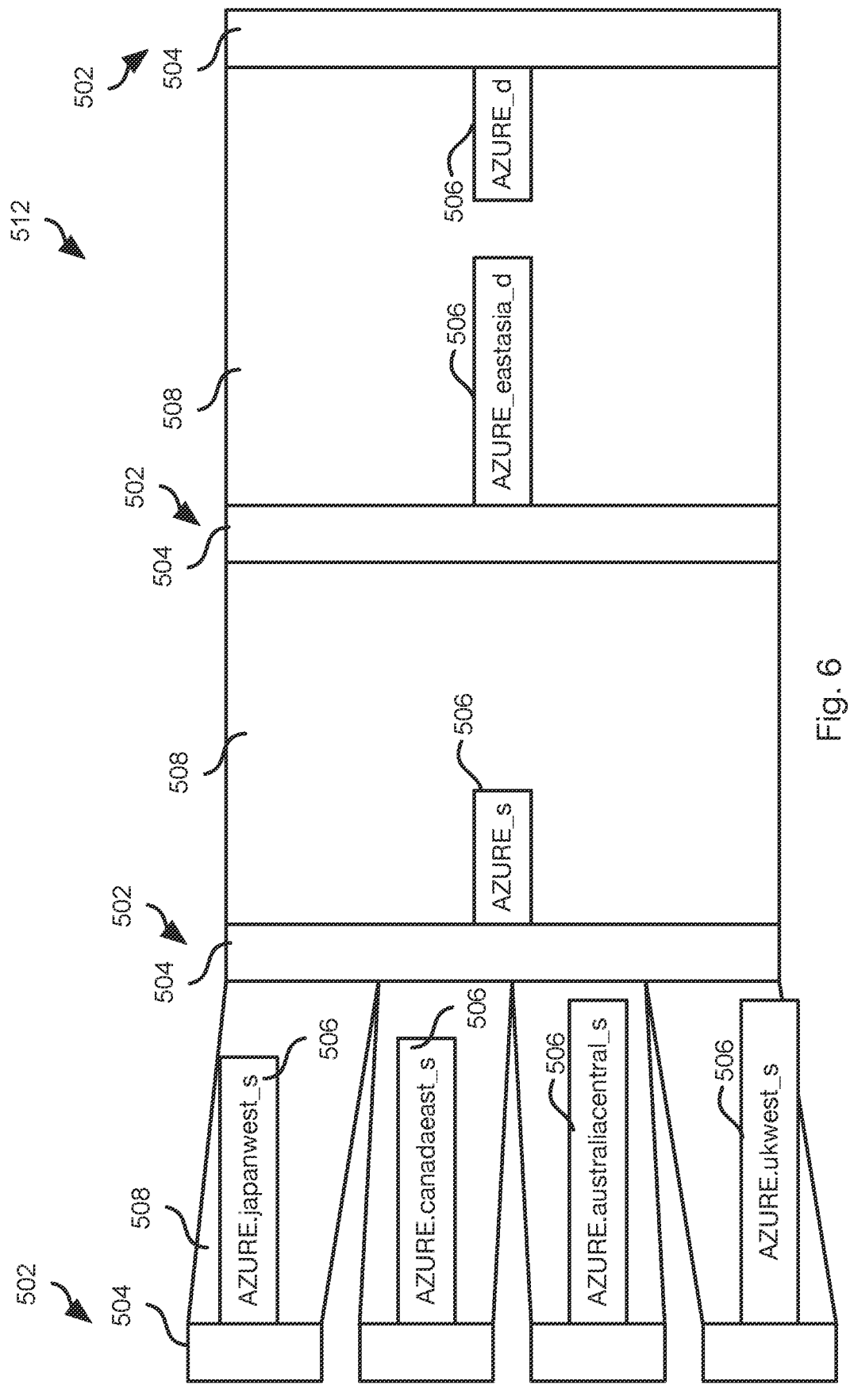
FIG. 6 is another example of a Sankey diagram for a cluster in accordance with an embodiment of the present invention.

Lines 508 spanning between bars 504 may represent segments having both values represented by the bars 504. In the illustrated embodiment, some of the lines 508 may include labels 510 to indicate the segments or group of segments represented by each line 508. In the illustrated embodiment, each horizontal position 502 is a sub-region of a particular CSP. The final bar represents a particular region of a particular CSP (AZURE). The visualization may enable an administrator to quickly see a root cause of connectivity issues for a cluster. For example, in FIG. 5, it is apparent that two AWS regions (AWS.me-south-1_s, ap-south-1_s) are having connectivity issues with respect to a single region (AZURE_d). FIG. 6 illustrates another example visualization 512 in which four AZURE regions (AZURE_japanwest_s, AZURE_canadaeast_s, AZURE_australiacentral_s, and AZURE_ukwest s) are all having connectivity issues with respect to one other AZURE region (AZURE_d).

FIGS. 7-10 illustrate an approach for handling events in the network environment 100. The approach is described with reference to one or more CSPs but may be implemented with respect to devices implementing any networking environment known in the art. The approach is particularly suited for hypertext transfer protocol (HTTP) events but may be adapted for use with other protocols as well.

Figure 7:
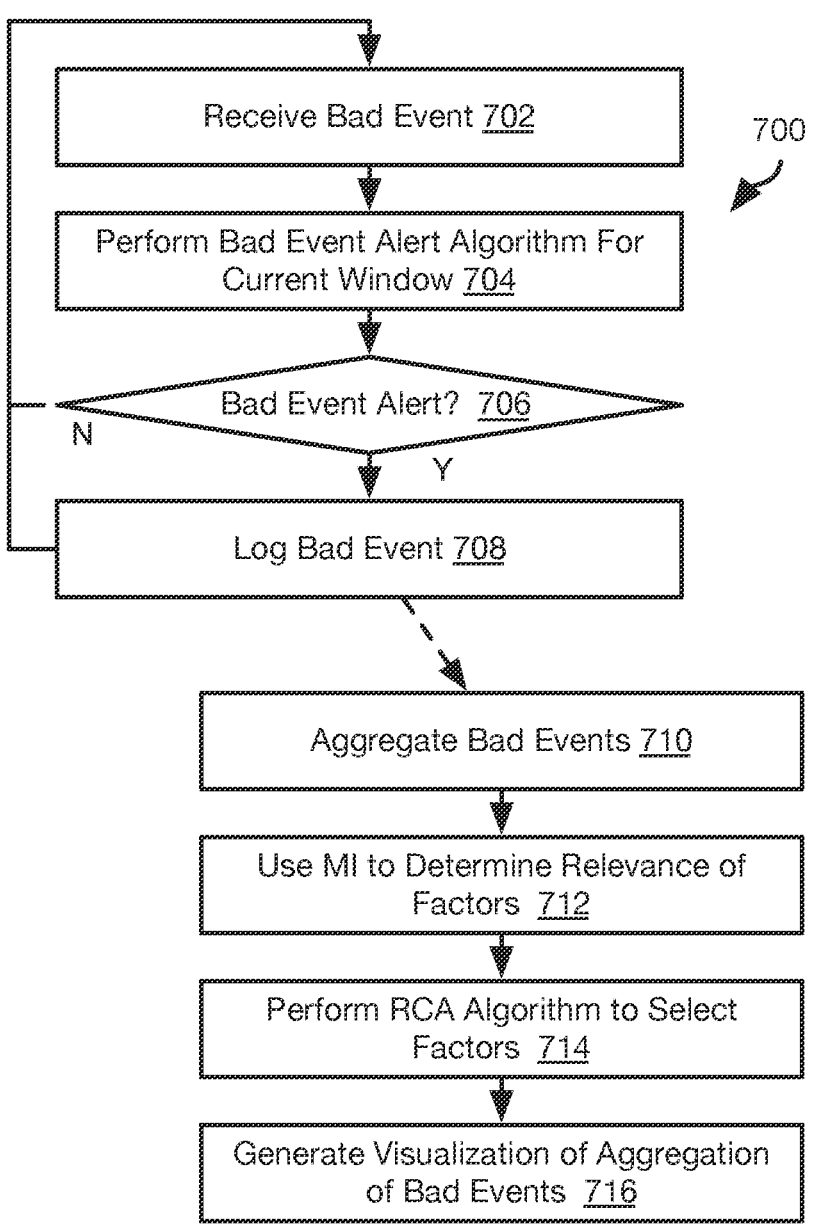
FIG. 7 is a process flow diagram of a method for processing bad events in accordance with an embodiment of the present invention.

FIG. 7 illustrates a method 700 for characterizing and aggregating events in the network environment 100. The method 700 may include receiving 702 a bad event from a source ("the event source"), which may be an edge cluster 110a-110d, user endpoint 112a-112d, a computing device within a cloud computing platform 102, or other source. Events may be transmitted to the device performing the method 700, e.g., the computing device executing the dashboard 114 ("hereinafter the implementing computing device") or may be retrieved from logs on the event source. In some embodiments, the event source may be configured to store event logs on the implementing computing device such that updates to these logs are detected by the implementing computing device. The method 700 may be executed with respect to each event source individually. In other implementations, events from multiple sources are processed together according to the method 700.

The method 700 may be performed for particular types of events that are bad events based on a type of the event, such as events indicating an unsuccessful status in response to a request, events indicating a redirect in response to a request, events indicating a request has been blocked, or events otherwise indicating an error. Upon receiving a bad event, the method 700 includes executing 704 a bad event alert algorithm with respect to bad events received within a current window. The bad event alert algorithm may include performing the method 800 of FIG. 8 described below. The current window may be a rolling window preceding the time of receiving 702 the event. For example, the preceding 15 minutes, hour, day, or some other interval.

The method 700 may include evaluating 706 whether the bad event was found to warrant a bad event alert at step 704. If so, the event is logged 708 as a bad event alert. For each bad event alert logged, (N being a predefined integer, or at a predefined time interval), some or all of steps 710-714 may be performed. The bad event alerts for the event source may be aggregated 710, such as using the method 900 of FIG. 9. A mutual information (MI) algorithm may be used 712 to determine relevance of factors and a root cause analysis (RCA) algorithm may be used to select factors for the aggregated bad event alerts. A visualization of the aggregated bad event alerts may then be generated 716 using the selected factors. An example implementation of steps 712-716 is described below with respect to FIGS. 10 and 11.

Figure 8:
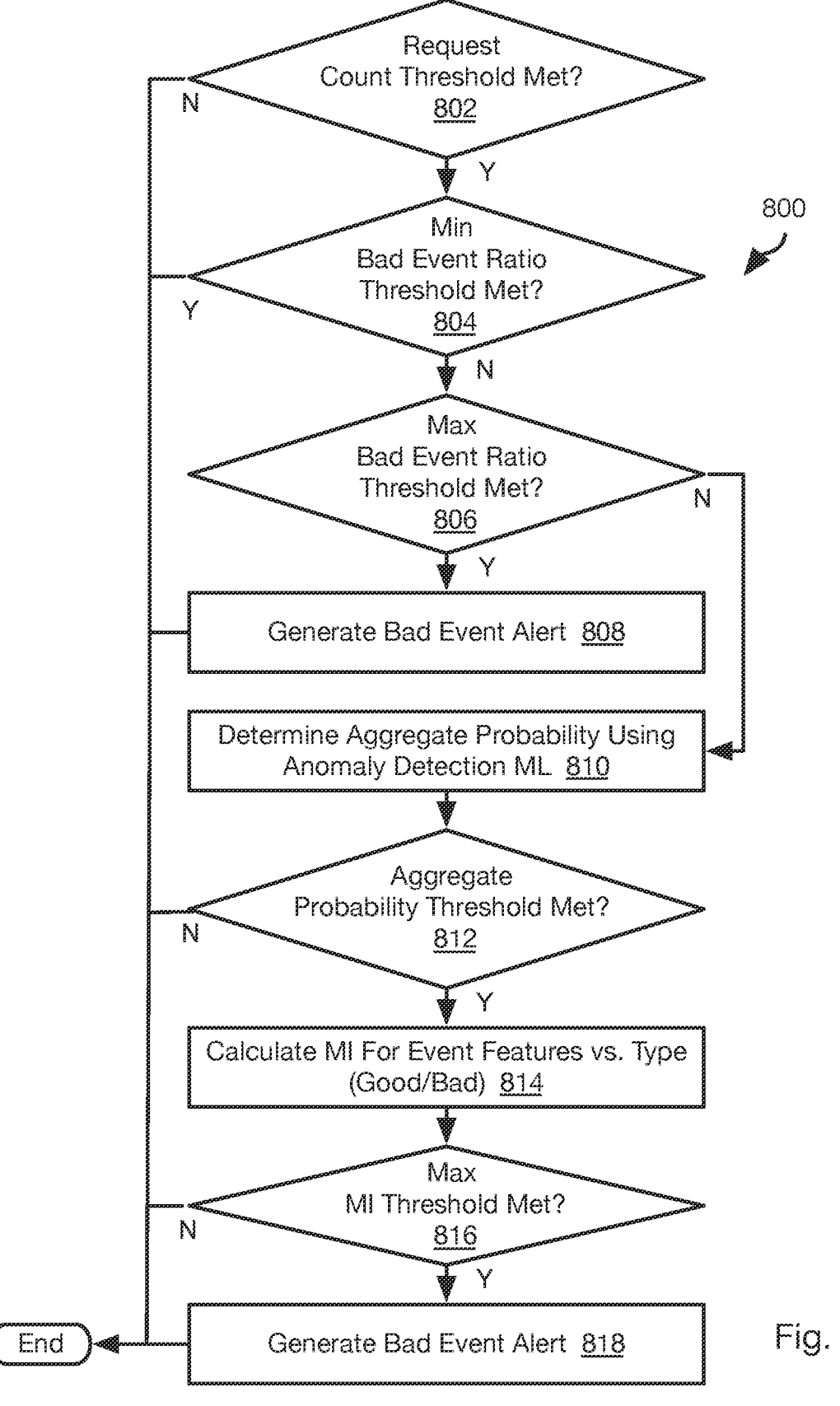
FIG. 8 is a process flow diagram of a method for generating bad event alerts in accordance with an embodiment of the present invention.

FIG. 8 illustrates a method 800 for determining whether a bad event alert should be generated. The method 800 may be executed with respect to data collected in a time window (hereinafter "the current window") and may be executed for each proceeding time window. As an example, the time window may be 15 minutes, but other time windows may also be used. The method 800 may include evaluating 802 whether a request count threshold has been met for the current window. Where the event source is only lightly loaded, bad events may be ignored. For example, if the event source has received a number of requests in the current window (hereinafter "request count") less than M in the current window, the subject event may be ignored. The value of M may be tuned to avoid false positives. In an example implementation, M may be a value between 50 and 150, between 80 and 120, or between 90 and 110. Requests may include requests for uniform resource locators (URL) received according to HTTP or requests according to other standard or proprietary protocols. Requests may be reported to the implementing computing device by the event source with events or may be reported separately to the implementing computing device. If the request count threshold is not found to be met, the method 800 may end.

The method 800 may include evaluating 804 whether a ratio of a number of bad events relative to the request count for the current window ("the ratio") is below a minimum ratio threshold. If the number of bad events is low relative to the number of requests received, this may indicate that further action is not needed. The minimum ratio threshold may be tuned to avoid false positives. For example, the minimum ratio threshold may be a value between 0.01 and 0.5. In some embodiments, the minimum ratio threshold is 0.1. If the ratio is less than the minimum ratio threshold, the method 800 may end.

The method 800 may include evaluating 806 whether the ratio is greater than a maximum ratio threshold. Where the number of bad events relative to the request count is high, a bad event alert may be generated without further evaluation. For example, the maximum ratio threshold may be between 0.3 and 0.7 or between 0.4 and 0.6. In some embodiments, the maximum ratio threshold is 0.5. If the ratio is greater than the maximum ratio threshold, a bad event alert may be generated 808 for the subject event and the method 800 may end. If the ratio is not greater than the maximum ratio threshold, the method 800 may include determining 810 aggregate probability using anomaly detection, such as using machine learning (ML).

Various ML models may be trained to perform various tasks. For example, the ML models may be neural networks, deep neural networks, convolution neural network, recurrent neural network, long short-term memory, Bayesian machine learning model, random forest machine learning model, logistic regression machine learning model, genetic algorithm, or other type of machine learning model.

The ML models may operate with respect to data for an individual user or a team of users. Hereinafter a team of users is referenced with the understanding that a single individual or a larger group of users could be used in a like manner.

A forecast ML model may be trained to forecast bad events for the team of users. The forecast ML model may receive event statistics generated for the team during a plurality of previous contiguous time windows. Each event may include a timestamp and a team identifier of the team, enabling the events to be associated with the team. The forecast ML model may then output a predicted number of bad events for the current time window based on the statistics for the plurality of previous contiguous time windows. For example, a time series may be captured for a team in which each entry in the time series includes a timestamp indicating the start or end time of a particular time window (e.g., 15 minute window) and a value indicating a number of bad events that occurred within the particular time window. Each entry in the time series for a time window may include other values for data collected during the time window such as one or more of a number of requests received, a number of distinct user identifiers from which user requests were received, a number of distinct domain identifiers from which request were received, e.g., application domain identifiers. The forecast ML model may be trained with the time series data using the number of bad events and possibly other values for a set of contiguous entries as inputs and the number of bad events of a subsequent entry as the desired output. The forecast ML model may be trained to output a predicted number of bad events for a future time window based on the time series data for a number of preceding time windows, such as from 1-50, 5 to 15, 8-12, or 10. For training purposes, the values for many time windows (e.g., many thousands) may be used to train the forecast ML model.

Other ML models may also be trained. For example, a team regression model may be trained using the time series data for the team of users, but without timestamps. The regression model may be trained to predict a value for the number of bad events for an individual window based on a distribution of other values in that given window for a given team (e.g., a number of requests received, a number of distinct user identifiers from which user requests were received, and a number of distinct domain identifiers from which request were received). Note that in this case other team data is not used to train the model to predict bad event count for this team. A global regression model may be generated in the same manner as the team regression model by using time series data for from multiple teams. Note that in this case the model may learn to predict bad event count irrespective of any single team.

Step 810 may therefore include using some or all of the above-described machine learning models to obtain a predicted number of bad events for the current window. For example, the predicted number of bad events for the machine learning models may be combined into an aggregate predicted number by averaging, weighted averaging, selecting the maximum predicted number of bad events, selecting the minimum predicted number of bad events, or some other approach.

The aggregate predicted number may be evaluated 812 with respect to an aggregate prediction threshold. For example, if the aggregate predicted number with respect to the total number of requests for the current window would result in the maximum bad event ratio (or some other predefined ratio) being met for the current window, the aggregate prediction threshold may be deemed to be met.

In a second approach, each regression model (team regression model and global regression model) is trained using previous time series data (possibly without regard to time stamp) to output, for a given number of bad events, a probability of occurrence of that number of bad events. In the second approach the forecast ML model may also be a regression model trained with time series data (possibly including time stamps) that outputs a probability of the number of bad events in a current window based on time series data of the current window and two or more time windows preceding the current time window. The number of preceding time windows is a user configurable parameter and may include one, three, or any number of preceding time windows.

In the second approach, step 810 may include obtaining a probability of occurrence of the current observed bad event count according to each ML model (team, global, forecast), aggregating these probabilities (sum, average, weighted average, max, min, or other aggregation) to obtain an aggregate probability and comparing the aggregate probability to an aggregate probability threshold. If the aggregate probability is greater than the aggregate probability threshold, then the threshold condition of step 812 is found to be met. Another approach is to use the upper bound of prediction from each ML model i.e. consider the probability of the bad event count for the current window according to each model and then use those probabilities in aggregate (averaged, weighted average, minimum, maximum, or other aggregation).

If the probability threshold is not found 812 to be met by the aggregate probability, the method 800 may end. If so, the method 800 may include calculating 814 mutual information factors for event features with respect to type.

For example, for each event received in the current time window, mutual information factors may be calculated to determine factors relevant to whether an event is a bad event or is not a bad event ("a benign event"). Calculating 814 mutual information factors may be performed using a mutual information algorithm as described hereinabove. Examples of candidate factors that may be considered may include some or all of the following non-exhaustive list of factors:

user id
    user country location
    user city location
    service provider of last mile
    AXI Edge Cloud service provider
    App cloud service provider
    session id of the user session app name
    device of user
    browser of user
    browser version
    operating system of user device
    operating system version of user device The result of step 814 may be a MI score assigned to each factor, the MI score indicating a degree to which values for each factor are relevant to distinguishing between bad events and benign events for the current time window. The method 800 may include evaluating 816 whether the maximum MI score of all the factors is above a relevance threshold, e.g. a value between 0.2 and 0.6 or between 0.3 and 0.5, or a value of 0.4. The value of the relevance threshold may be tuned iteratively. If not, the method 800 ends. If so, the method 800 may include generating 818 a bad event alert for the subject event.

Step 816 may advantageously perform a degree of root cause analysis when determining whether a bad event merits a bad event alert. By evaluating the maximum MI score, bad event alerts may be selected based on whether at least one particular factor is relevant to the bad events within the current time window.

Figure 9:
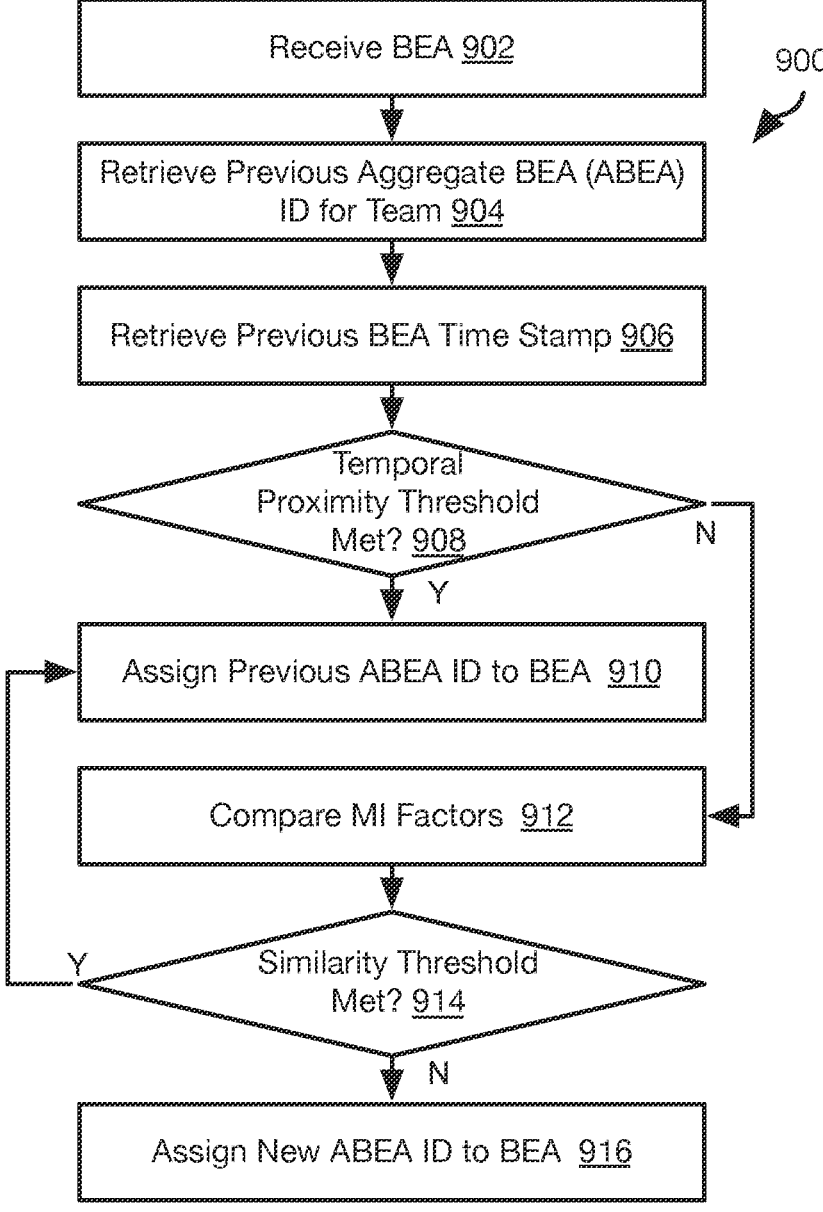
FIG. 9 is a process flow diagram of a method for aggregating bad event alerts in accordance with an embodiment of the present invention.

FIG. 9 illustrates a method 900 that may be used to aggregate events, such as bad events for which bad event alerts (BEA) were generated according to the method 800. The method 900 may include receiving 902 each BEA generated according to the method 800 ("the subject BEA"). The method 900 may include retrieving 904 an aggregate BEA (ABEA) identifier (ABEA ID) for a previous ABEA, i.e., an ABEA ID assigned to one or more previously received BEA according to the method 900. For a first BEA generated, the BEA may be assigned an ABEA ID without performing the method 900 and the method 900 may be performed for subsequent BEA. A timestamp for the previously received BEA may also be retrieved 906. The timestamp of each BEA may be the time stamp of the event for which the BEA was generated according to the method 800.

The method 900 may include evaluating 908 whether the time stamp of the previous BEA has a threshold level of temporal proximity to the time stamp of the subject BEA. The temporal proximity threshold is a tunable parameter that may be selected to facilitate grouping relevant BEA with one another.

If the difference between the timestamps is below the temporal proximity threshold (e.g., a difference of 10-20 minutes and a temporal proximity threshold of an hour), the subject BEA may be assigned 910 the previous ABEA ID. In some embodiments, the subject BEA will otherwise be assigned 916 a new ABEA ID.

In other embodiments, if the temporal proximity threshold is not found to be met, the method 900 may include comparing 912 the MI factors to those of the BEA assigned the previous ABEA ID. Various metrics of similarity may be used. For example, the scores for the MI factors may be considered as a vector. The vector for the previous ABEA ID may be the vector of the most recent BEA assigned to the previous ABEA ID or an average of the vectors of all BEA assigned to the previous a ABEA ID. The vector for the previous ABEA ID may be compared to the vector for the subject BEA using any approach for comparing vectors, such as cosine distance. If the cosine distance is less than a predefined distance threshold, the similarity threshold may be found 914 to be met. Alternatively, the L factors with the highest MI scores for the subject BEA may be compared to the L factors with the highest MI scores for the previous ABEA ID (averaged for all previous BEA or just for the most recent BEA), where L is an integer of one or more. If the same factors are in the top L factors for both, the similarity threshold may be found 914 to be met.

If the similarity threshold is found 914 to be met, the subject BEA may be assigned 916 the previous ABEA ID. Otherwise, the subject BEA is assigned 916 a new ABEA ID.

Figures 10, 11:
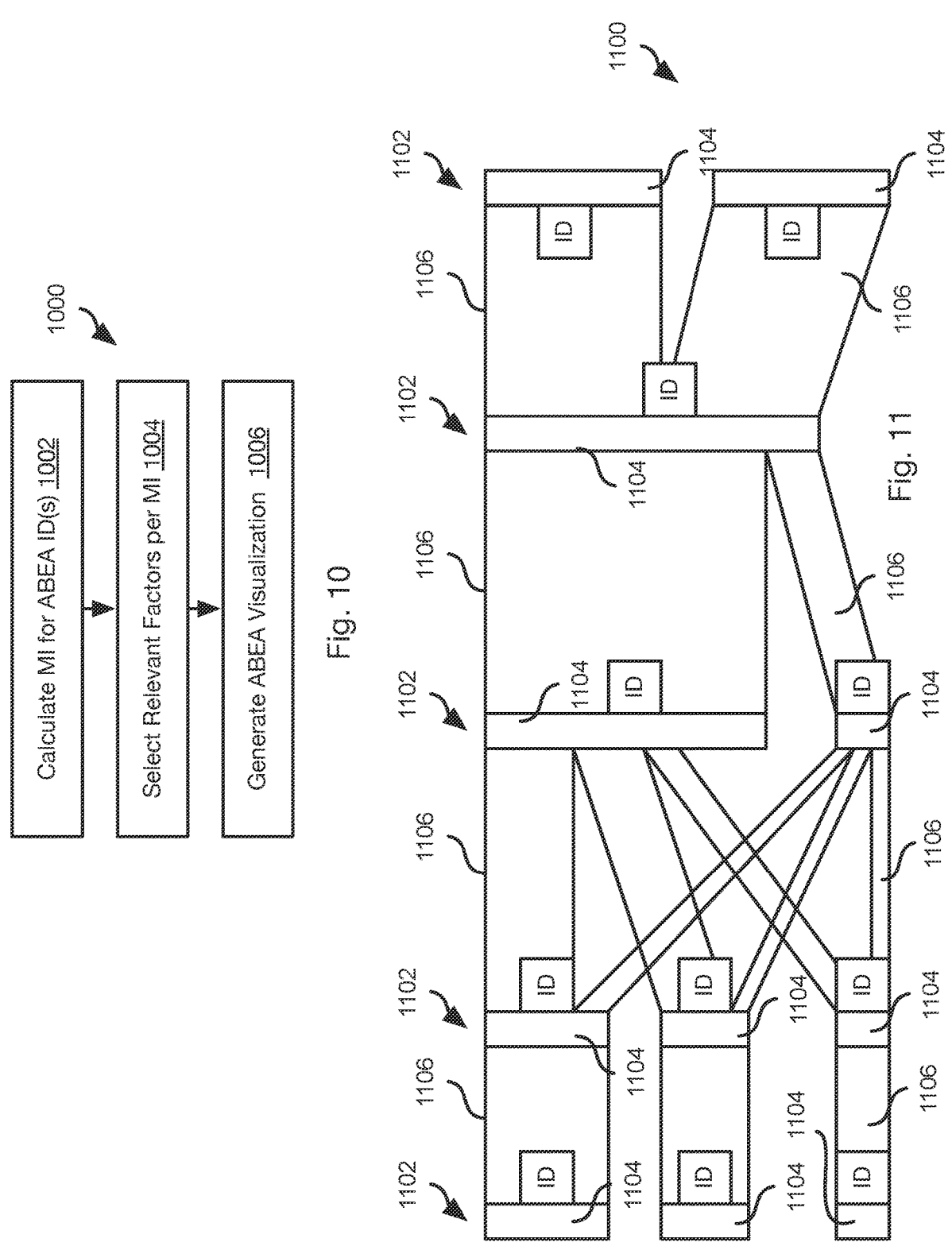
FIG. 10 is a process flow diagram of a method for visualizing aggregated bad event alerts in accordance with an embodiment of the present invention.
FIG. 11 is an example Sankey diagram for aggregated bad event alerts in accordance with an embodiment of the present invention.

Referring to FIG. 10, the method 1000 may be performed with respect to each ABEA ID. The method 1000 may be performed with respect to all BEA assigned the ABEA ID or may be performed for a subset. For example, the method 1000 may be performed with respect to BEA remaining after filtering, such as filtering with respect to user ID, application name, or any of the factors described above. The method 1000 may be performed with respect to the BEAs assigned multiple ABEA IDs. For example, a user seeing an issue occurring at a given time or time window may search for ABEA IDs having time stamps corresponding to that time or time window. For example, each ABEA ID having an earliest timestamp and latest timestamp including the time or included in the time window may be selected. The earliest timestamp of an ABEA ID may be the timestamp of the first BEA assigned the ABEA ID and the latest timestamp may be the timestamp of the last BEA assigned to the ABEA ID as of the time of executing the method 1000. The BEA of multiple ABEA IDs may also be filtered to obtain a subset of the BEA as described above.

For the BEA selected for processing according to the method 1000 ("the subject BEAs"), the method 1000 may include calculating 1002 mutual information (MI) for the BEA. Step 1002 may include calculating the relevance of factors (such as those listed above) to whether an event is included as one of the subject BEA or not. For example, a MI algorithm may be used to process all events for all time windows for which one of the subject BEA was logged. The MI algorithm may be executed to determine relevance of the factors to whether each of the events is a bad event or a benign event.

In an alternative approach, for each BEA of the subject BEAs, MI scores may have been previously calculated at step 814 of the method 800. These same MI scores may be used. For example, for each factor, the MI scores for that factor for each BEA of the subject BEAs may be summed, averaged, or otherwise combined to obtain an aggregate MI score for that factor. The top L (e.g., four) factors with the highest aggregate MI scores may then be selected 1004 as relevant.

Referring to FIG. 11, the selected factors may then be used to generate 1006 a visualization of the subject BEAs. For example, a Sankey diagram 1100 may be generated 1006. In the illustrated Sankey diagram, each column 1102 represents one of the selected factors and each separate bar 1104 in each column 1102 represents a specific value for the factor represented by that column 1102. Each bar 1104 may be labeled with an identifier ID that is the value represented by the bar 1104 or derived therefrom. Each stripe 1106 extending between bars 1104 represents one or more BEA that have both values represented by the bars 1104 connected by that stripe 1106.

Using the Sankey diagram 1100, an administrator can quickly perform root cause analysis with respect to the BEA represented by the Sankey diagram 1100. For example, it can be seen that there is one bar 1104 that is connected to all strips 1106 indicating that all of the BEA have the same value for the factor represented by the bar 1104.

Figure 12:
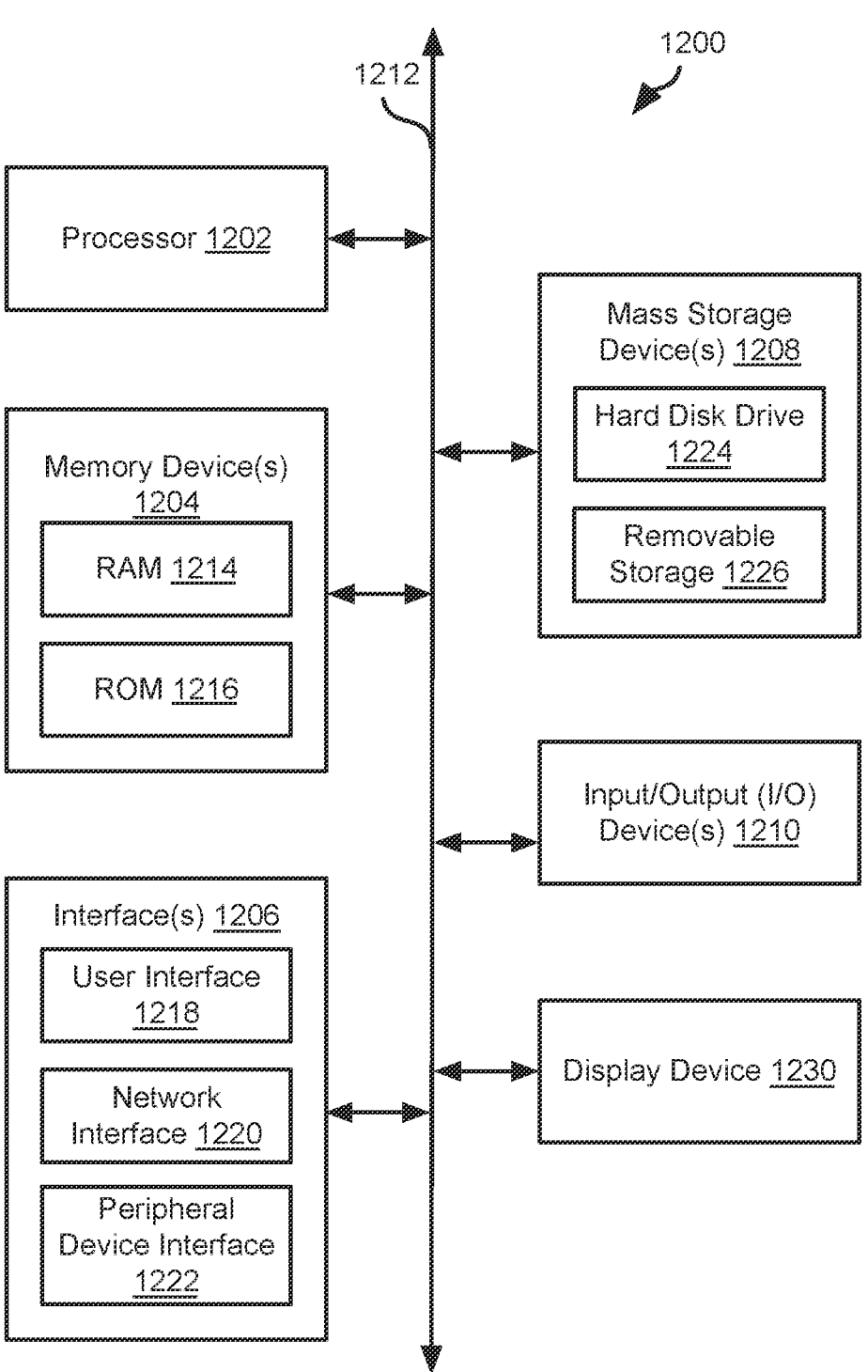
FIG. 12 is a schematic block diagram of a computing device that may be used to implement the systems and methods described herein.

FIG. 12 illustrates an example computing device 1200 that may be used to implement a cloud computing platform or any other computing devices described above. In particular, components described above as being a computer or a computing device may have some or all of the attributes of the computing device 1200 of FIG. 12. FIG. 12 is a block diagram illustrating an example computing device 1200 which can be used to implement the systems and methods disclosed herein Computing device 1200 includes one or more processor(s) 1202, one or more memory device(s) 1204, one or more interface(s) 1206, one or more mass storage device(s) 1208, one or more Input/Output (I/O) device(s) 1210, and a display device 1230, all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more user interface elements 1218. The interface(s) 1206 may also include one or more peripheral interfaces such as interfaces for printers, pointing devices (mice, track pad, etc.), keyboards, and the like.

Bus 1212 allows processor(s) 1202, memory device(s) 1204, interface(s) 1206, mass storage device(s) 1208, and I/O device(s) 1210 to communicate with one another, as well as other devices or components coupled to bus 1212. Bus 1212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1200, and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, references have been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, which may comprise, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. Components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:

monitoring, by a computer system, a time window of events over time from a plurality of nodes in a network environment to detect bad events, wherein each event comprises a plurality of factors;

in response to detection of a bad event, determining whether to generate a bad event alert, wherein determining whether to generate a bad event alert comprises, maintaining counts of bad and benign events observed in a current time window and determining whether a ratio of bad events within the current time window satisfies a first threshold;

based on determining that the ratio of bad events within the current time window does not satisfy the first threshold, determining with trained machine learning models bad events predicted for the current time window across an organization and bad events predicted for at least one of a user and a team for the current time window, wherein the trained machine learning models comprise at least one of regression models and neural network models;

aggregating counts of the predicted bad events;

determining whether the aggregated counts satisfies a second threshold; and based on determining that the aggregated counts satisfies the second threshold, calculating, according to a mutual information algorithm that uses recursive adaptive partitions for the plurality of factors, relevance of each of the plurality of factors of each event observed within the current time window with respect to the event being a bad event type or a benign event type;

determining, by the computer system, that a maximum relevance of the relevancies of the plurality of factors exceeds a maximum relevance threshold and generating a bad event alert based on the determination; and in response to generating the bad event alert, logging a bad event alert.

2. The method of claim 1, further comprising generating a visualization of the bad event alert.

3. The method of claim 2, wherein the visualization is a Sankey diagram.

4. The method of claim 3, wherein each column of the Sankey diagram represents a factor of the plurality of factors.

5. The method of claim 1, wherein the bad event alert is a first bad event alert, the method further comprising:

determining, by the computer system, that the first bad event alert meets one of a temporal proximity threshold and a similarity threshold with respect to a previously generated second bad event alert; and in response to determining that the first bad event alert meets one of the temporal proximity threshold and the similarity threshold with respect to the second bad event alert, aggregating the first bad event alert with the second bad event alert.

6. The method of claim 5, wherein the second bad event alert corresponds to a preceding time window.

7. The method of claim 6, further comprising:

performing, by the computer system, the mutual information algorithm with respect to events of the plurality of events in the preceding time window;

selecting, by the computer system, a subset of factors of the plurality of factors based on an output of the mutual information algorithm; and generating, by the computer system, a visualization of values for the subset of factors for the events corresponding to the first bad event alert and the second bad event alert.

8. The method of claim 1, wherein aggregating counts of the predicted bad events comprises averaging count of the predicted bad events across the organization and count of the predicted bad events of the user or the team or selecting a maximum of the count of the predicted bad events across the organization and the count of the predicted bad events of the user or the team.

9. The method of claim 1, wherein the trained machine learning models were trained to forecast a predicted count of bad events based on event statistics, wherein a first of the trained machine learning models was trained with event statistics for the organization and a second of the trained machine learning models was trained with event statistics for the user or the team.

10. The method of claim 9, wherein event statistics comprise time-series of counts of bad events in different time windows and at least one of number of requests per time window, number of distinct domain identifiers per time window, and number of distinct user identifiers per time window.

11. The method of claim 1 further comprising determining that a minimum number of requests have been received by the nodes within the current time window, wherein determining whether a ratio of bad events within the current time window satisfies a first threshold is dependent on determining that the minimum number of request have been received.

12. A non-transitory, computer-readable medium having stored thereon program code comprising instructions to:

monitor a time window of events over time from a plurality of nodes in a network environment to detect bad events, wherein each event comprises a plurality of factors;

in response to detection of a bad event, determine whether to generate a bad event alert, wherein the instructions to determine whether to generate a bad event alert comprise instructions to, maintain counts of bad and benign events observed in a current time window and determine whether a ratio of bad events within the current time window satisfies a first threshold;

based on a determination that the ratio of bad events within the current time window does not satisfy the first threshold, determine with trained machine learning models bad events predicted for the current time window across an organization and bad events predicted for at least one of a user and a team for the current time window, wherein the trained machine learning models comprise at least one of regression models and neural network models;

aggregate counts of the predicted bad events;

determine whether the aggregated counts satisfies a second threshold; and based on determining that the aggregated counts satisfies the second threshold, calculate, according to a mutual information algorithm that uses recursive adaptive partitions for the plurality of factors, relevance of each of the plurality of factors of each event observed within the current time window with respect to the event being a bad event type or a benign event type;

determine whether a maximum relevance of the relevancies of the plurality of factors exceeds a maximum relevance threshold and generate a bad event alert based on a determination that the maximum relevance of the relevancies of the plurality of factors exceeds the maximum relevance threshold; and in response to generating the bad event alert, logging a bad event alert.

13. The non-transitory, computer-readable medium of claim 12, wherein the instructions to aggregate counts of the predicted bad events comprise instructions to average count of the predicted bad events across the organization and count of the predicted bad events of the user or the team or instructions to select a maximum of the count of the predicted bad events across the organization and the count of the predicted bad events of the user or the team.

14. The non-transitory, computer-readable medium of claim 12, wherein the trained machine learning models were trained to forecast a predicted count of bad events based on event statistics, wherein a first of the trained machine learning models was trained with event statistics for the organization and a second of the trained machine learning models was trained with event statistics for the user or the team.

15. The non-transitory, computer-readable medium of claim 14, wherein event statistics comprise time-series of counts of bad events in different time windows and at least one of number of requests per time window, number of distinct domain identifiers per time window, and number of distinct user identifiers per time window.

16. The non-transitory, computer-readable medium of claim 12, wherein the program code further comprises instructions to determine whether a minimum number of requests have been received by the nodes within the current time window, wherein the instructions to determine whether a ratio of bad events within the current time window satisfies a first threshold execute based on a determination that the minimum number of request have been received.

17. The non-transitory, computer-readable medium of claim 12, wherein the program code further comprises instructions to generate a visualization of the bad event alert, wherein the visualization is a Sankey diagram and each column of the Sankey diagram represents a factor of the plurality of factors.

18. An apparatus comprising:

a processor; and a computer-readable medium having stored thereon instructions executable by the processor to cause the apparatus to, monitor a time window of events over time from a plurality of nodes in a network environment to detect bad events, wherein each event comprises a plurality of factors;

in response to detection of a bad event, determine whether to generate a bad event alert, wherein the instructions to determine whether to generate a bad event alert comprise instructions executable by the processor to cause the apparatus to, maintain counts of bad and benign events observed in a current time window and determine whether a ratio of bad events within the current time window satisfies a first threshold;

based on a determination that the ratio of bad events within the current time window does not satisfy the first threshold, determine with trained machine learning models bad events predicted for the current time window across an organization and bad events predicted for at least one of a user and a team for the current time window, wherein the trained machine learning models comprise at least one of regression models and neural network models;

aggregate counts of the predicted bad events;

determine whether the aggregated counts satisfies a second threshold; and based on determining that the aggregated counts satisfies the second threshold, calculate, according to a mutual information algorithm that uses recursive adaptive partitions for the plurality of factors, relevance of each of the plurality of factors of each event observed within the current time window with respect to the event being a bad event type or a benign event type;

determine whether a maximum relevance of the relevancies of the plurality of factors exceeds a maximum relevance threshold and generate a bad event alert based on a determination that the maximum relevance of the relevancies of the plurality of factors exceeds the maximum relevance threshold; and in response to generating the bad event alert, logging a bad event alert.

19. The apparatus of claim 18, wherein the instructions to aggregate counts of the predicted bad events comprise instructions executable by the processor to cause the apparatus to average count of the predicted bad events across the organization and count of the predicted bad events of the user or the team or instructions to select a maximum of the count of the predicted bad events across the organization and the count of the predicted bad events of the user or the team.

20. The apparatus of claim 18, wherein the trained machine learning models were trained to forecast a predicted count of bad events based on event statistics, wherein a first of the trained machine learning models was trained with event statistics for the organization and a second of the trained machine learning models was trained with event statistics for the user or the team.

21. The apparatus of claim 20, wherein event statistics comprise time-series of counts of bad events in different time windows and at least one of number of requests per time window, number of distinct domain identifiers per time window, and number of distinct user identifiers per time window.

22. The apparatus of claim 18, wherein the computer-readable medium further has stored thereon instructions executable by the processor to cause the apparatus to determine whether a minimum number of requests have been received by the nodes within the current time window, wherein the instructions to determine whether a ratio of bad events within the current time window satisfies a first threshold execute based on a determination that the minimum number of requests have been received.

23. The apparatus of claim 18, wherein the program code further comprises instructions to generate a visualization of the bad event alert, wherein the visualization is a Sankey diagram and each column of the Sankey diagram represents a factor of the plurality of factors.

* * * * *